No. 822,113. PATENTED MAY 29, 1906.
W. H. GLOCKER.
FISHING REEL.
APPLICATION FILED JAN. 27, 1906.
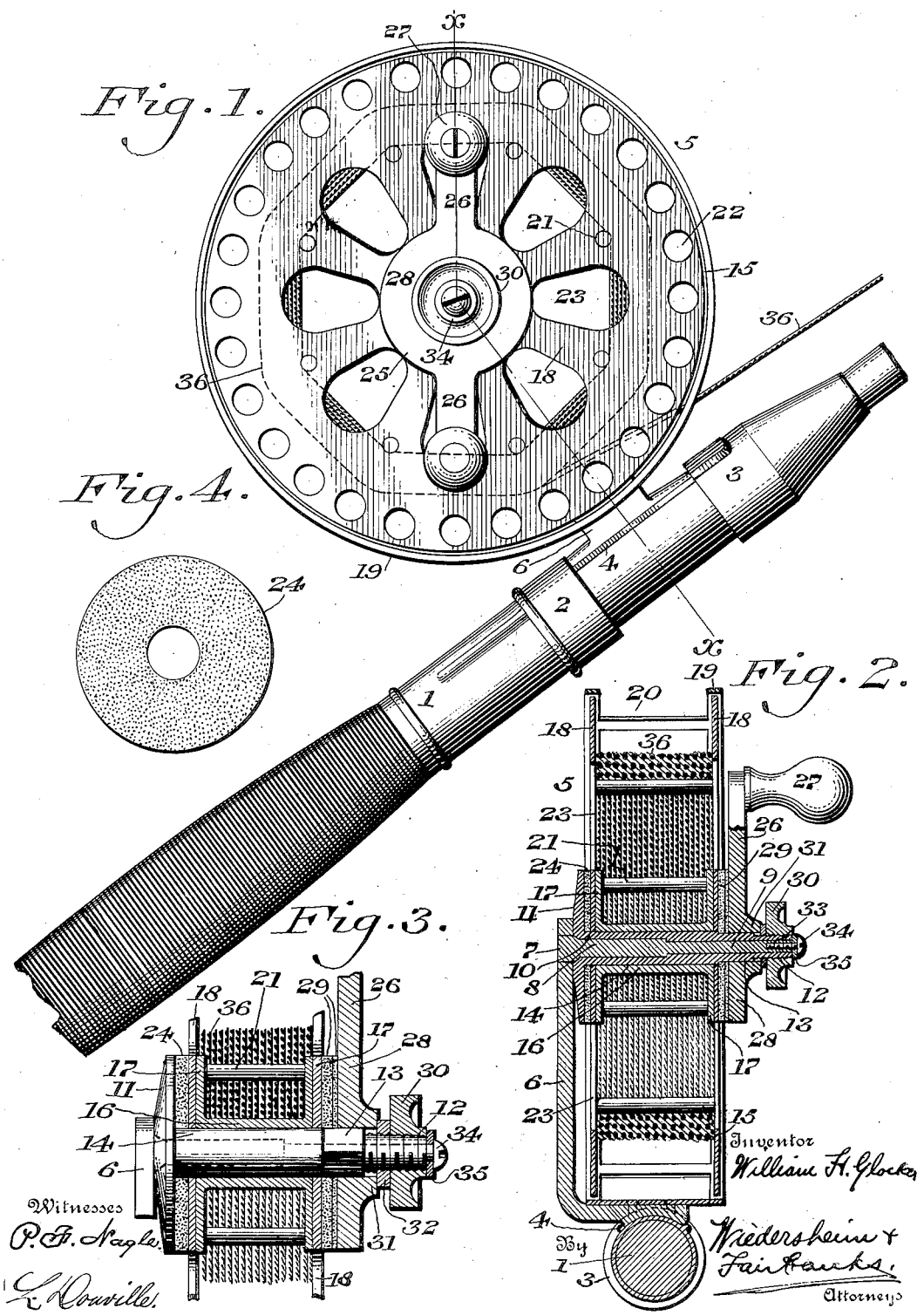

UNITED STATES PATENT OFFICE.

WILLIAM H. GLOCKER, OF PHILADELPHIA, PENNSYLVANIA, ASSIGNOR TO HARRY W. SCOTT, OF PHILADELPHIA, PENNSYLVANIA.

FISHING-REEL.

No. 822,113.  Specification of Letters Patent.  Patented May 29, 1906.

Application filed January 27, 1906. Serial No. 298,275.

*To all whom it may concern:*

Be it known that I, WILLIAM H. GLOCKER, a citizen of the United States, residing in the city and county of Philadelphia, State of Pennsylvania, have invented a new and useful Fishing-Reel, of which the following is a specification.

My invention consists of a novel construction of a fishing-reel which after the "strike" has been made, or, in other words, the fish has taken the bait, there is no possibility of the line becoming slack when the fish turns on its track or moves toward the person holding the rod to which the reel is attached, and when the fish is being "played" the crank-arm of the reel is continuously rotated in the same direction, it being immaterial whether the fish is moving toward or away from the fisherman.

To the above ends my invention consists of a novel construction of a reel in which the reel-body has only frictional engagement with the means for rotating the same, there being no direct connection between the reel-body and its actuating mechanism, which latter is also rotatably mounted.

It further consists of a novel construction whereby the frictional engagement between the reel-body and its actuating mechanism may be varied as desired, according to the conditions and requirements.

It further consists of other novel features of construction, all as will be hereinafter fully set forth.

Figure 1 represents a perspective view of a reel embodying my invention, showing the same as attached to a fishing-rod. Fig. 2 represents a sectional view on line $x\ x$, Fig. 1. Fig. 3 represents a sectional view of a portion of the device on an enlarged scale and in detached position. Fig. 4 represents a plan view of one of the friction-disks employed.

Similar numerals of reference indicate corresponding parts in the figures.

Referring to the drawings, 1 designates a fishing rod or pole of any suitable or conventional type, the same being provided with a sliding collar 2 and a fixed portion 3, having a depression therein whereby the supporting arm or bracket 4 of the reel 5 may be detachably secured thereto. Extending angularly from the base of the arm 4 and integral therewith, if desired, is an arm 6, having fixed thereto at a suitable point a rod 7, having the different diameters 8 and 9.

10 designates a sleeve having differential bores with which the different diameters 8 and 9 of the pivot-rod 7 are adapted to engage. This sleeve 10 has secured thereto at one end a flange or disk 11, the outer face of which is suitably beveled, as seen in Figs. 2 and 3. The sleeve 10 is threaded at its outer end, as seen at 12. The sleeve is faced off so as to form a plurality of sides, and in the present instance I have shown the same as being squared, as seen at 13, said squared portion extending inwardly from the threaded portion 12.

14 designates a portion of the sleeve extending from the square or other sided portion 13 to the disk or flange 11, this portion, as seen in Figs. 2 and 3, having the same diameter throughout.

15 designates a reel-body which has a sleeve 16, which is rotatably mounted on the outer bearing portion 14 of the sleeve 10, said sleeve 16 having the outer flanges 17, which are secured to the side portions 18 of the reel in any suitable manner.

19 designates a guard suitably secured in the present instance to the arm or bracket 4, said guard being suitably cut away or apertured, as seen at 20.

21 designates the cross pins or rods secured to the sides and on which the line 36 is wound. The sides of the frame have suitable recesses 22 and 23 therein for reducing the weight of the reel-body.

24 designates a friction-washer of any desired form, which in the present instance I have shown as being disk-shaped, said washer being interposed between the disk or flange 11 and the contiguous side of the reel-body 15.

25 designates the actuating lever or crank, having diametrically opposite arms 26, each of which has secured at its end a suitable handle 27. The center of this crank-arm 25 in the present instance is in the form of a cylindrical disk, as seen at 28, and has a square-shaped aperture therethrough or one corresponding to the faced-off portion of the sleeve 10, whereby said crank-arm is adapted to be non-rotatably seated on the square or other sided portion 13 of the sleeve 10. Interposed between the disk portion 28 and the contiguous side of the reel-body 15 are one or more friction-washers 29.

30 designates a nut engaging the threaded portion 12 of the sleeve 10. Between this nut 30 and the boss 31 of the crank-arm 25 is interposed a washer 32. The end of the sleeve 10 is internally threaded, as at 33, thus adapting the same to receive a screw or bolt 34, between the head of which and the nut 30 is interposed a washer 35, whereby the nut 30 is prevented from becoming disengaged from the threaded portion 12 of the sleeve 10, the washer 35 and the screw 34 thereby serving as a lock-nut for the nut 30.

36 designates the line, which is wound upon the reel in the usual manner.

The operation is as follows: It will be understood that the reel-body 15 and the sleeve 10, on which it is mounted, are both free to turn with respect to the central supporting-rod 7. When the fish takes the bait and starts to run therewith, the fisherman takes hold of one of the handles 27 and turns the crank-arm 25 to the right and continues to turn the crank-arm in this same direction until the fish is brought sufficiently near to the fisherman to gaff the same or otherwise remove the fish from the water.

It will be seen that if the fish exerts a stronger pull than the frictional engagement of the sides of the reel-body with the disk 11 and the disk 28 of the crank through the interposition of the friction-washers, although the operator is turning the crank-arm always in the same direction, the reel-body itself will be allowed to turn backward or to the left, and thus more line will be given to the fish. As soon, however, as the fish stops pulling or turns on its track, the pull on the line being now less than the frictional engagement between said body sides and said disks 11 and 28, the reel-body will be rotated toward the right and the line wound on the reel, thus bringing the fish all the time nearer to the operator.

It will now be apparent that there will be no slack line from the time the strike is made until the fish is captured, although the rotating means for the reel mechanism always turns in the same direction.

It will further be apparent that the friction between the reel-body and the actuating means may be varied as desired, according to the conditions and requirements, by adjusting the nut 30, and the adjustment given to this nut 30 may be maintained by means of the washer 35 and the screw 34.

The advantages of a reel mechanism in which the reel-body has adjustable frictional engagement with its actuating means and in which the actuating-crank is always turned in the same direction, whether the fish which has taken the bait is moving toward or away from the fisherman, will be apparent to those skilled in the art, and my claims to these features are to be interpreted with corresponding scope. While in the present instance I have shown these friction-washers as being disk-shaped, it will be apparent that they may be otherwise shaped and formed and that washers of various thicknesses may be employed, according to the conditions and requirements.

It is further to be understood that by the term "friction" or "disk" washers I refer to any suitable material, such as ordinarily employed, which has been treated with friction material or which is made directly from such friction material.

It will be further apparent that while in the present instance for convenience of illustration I have shown the crank-arm 25 as being seated on a square portion 13 it is only essential that said arm be non-rotatably mounted on said sleeve, but so mounted that longitudinal movement thereon will be permitted in order to adjust the frictional engagement between the coacting parts.

It will be further apparent that if the fish is "running with the bait" and drawing the line from the reel, although the actuating mechanism rotating the reel is continuously rotated in the same direction, the frictional material interposed between the actuating mechanism and the reel-body will act as a brake and tend to prevent the line from unwinding from the reel, and it will also be apparent that the strength of this braking action may be varied as desired by adjusting the screw 30.

It will be further apparent that the reel-body may be readily checked or braked by a slight pressure of the finger or thumb of the operator against the guard 19, which will cause said guard to closely engage the reel-body, and thereby check the rotation of the same.

While I have spoken of friction material being interposed between the reel-body and its actuating mechanism, it will be apparent that it is not essential that this be a solid disk, since any pliable material ordinarily employed for friction-disks may be employed—such as leather, paper, fiber, felt, cloth, or soft fibrous material.

Having thus described my invention, what I claim as new, and desire to secure by Letters Patent, is—

1. In a reel, a crank mechanism rotatably mounted and including a crank-arm, a reel-body having sides loosely mounted on said mechanism, friction material interposed between the sides of said reel-body and said crank mechanism, and means engaging said crank-arm for varying the frictional engagement between the sides of said reel-body and said mechanism.

2. In a reel, a central support, a sleeve provided with a flange rotatably mounted thereon, a handle non-rotatably secured to said sleeve near one end thereof, a reel-body having sides loosely mounted on said sleeve between said flange and said handle, and friction material interposed between said flange and handle and the contiguous sides of said reel-body.

3. In a reel, a central support, a sleeve mounted thereon, a flange secured to said sleeve, a handle non-rotatably mounted on said sleeve, a reel-body having sides loosely mounted on said sleeve, friction material between said flange and the contiguous side of said reel-body and between said crank-arm and the side of said body contiguous thereto, and a nut on said sleeve for adjusting the frictional engagement between the sides of said body, said flange and crank-arm.

4. In a reel, a central support, a sleeve mounted thereon, a disk secured to said sleeve, a handle non-rotatably mounted on said sleeve, a reel-body having sides loosely mounted on said sleeve, friction material between said disk and the contiguous side of said reel-body and between said crank-arm and the side of said reel-body contiguous thereto, a nut on said sleeve for adjusting the frictional engagement between the sides of said body and said disk and crank-arm, and means for locking said nut in the adjusted position given thereto.

5. In a reel, a central support, a sleeve mounted thereon, a disk secured to said sleeve, a handle non-rotatably mounted on said sleeve, a reel-body having sides loosely mounted on said sleeve, friction material between said crank-arm and the contiguous side of said reel-body, and between the crank-arm and the side of said body contiguous thereto, a nut on said sleeve for adjusting the frictional engagement between the sides of said body and said disk and crank-arm, a screw having threaded engagement with the outer end of said central support, and a washer interposed between the head of said screw and said nut.

6. In a reel, a central support having different diameters, a sleeve having a flange at one end thereof loosely mounted on said support, a handle non-rotatably mounted on said sleeve, a reel-body having sides loosely mounted on said sleeve between said flange and said crank-arm, friction material interposed between said flange and the contiguous side of said body and between said crank-arm and the side of said body contiguous thereto, and means mounted on said sleeve for adjusting the frictional engagement between the sides of said body and said flange and crank-arm.

7. In a reel, a central support having different diameters, a sleeve having a flange at one end thereof loosely mounted on said support, a handle non-rotatably mounted on said sleeve, a reel-body having sides loosely mounted on said sleeve between said flange and said crank-arm, friction material interposed between said flange and the contiguous side of said body and between said crank-arm and the side of said body contiguous thereto, a nut having threaded engagement with the end of said sleeve, a washer interposed between said nut and said crank-arm, and means for locking said nut in the different positions given thereto.

8. In a reel mechanism, a supporting-bracket, an arm extending angularly therefrom, a central support carried by said arm, a sleeve having a flange at one end mounted on said support, a crank-arm non-rotatably carried by said sleeve, a reel-body having sides loosely mounted on said sleeve between said flange and said crank-arm, friction material interposed between said flange and crank-arm and the contiguous sides of said body, and means engaging said crank-arm for varying the frictional engagement between the sides of said body and said flange and crank-arm.

9. In a reel, a central support, a sleeve mounted thereon, a flange secured to said sleeve, a crank-arm non-rotatably mounted on said sleeve, a reel-body having sides loosely mounted on said sleeve, friction material between said flange and between the contiguous side of said reel-body and between said crank-arm and the side of said body contiguous thereto, and means on said sleeve for adjusting the frictional engagement between the sides of said body, said flange and crank-arm.

WILLIAM H. GLOCKER.

Witnesses:
ISAAC ARROTT,
WILBER A. ROSE.